UNITED STATES PATENT OFFICE.

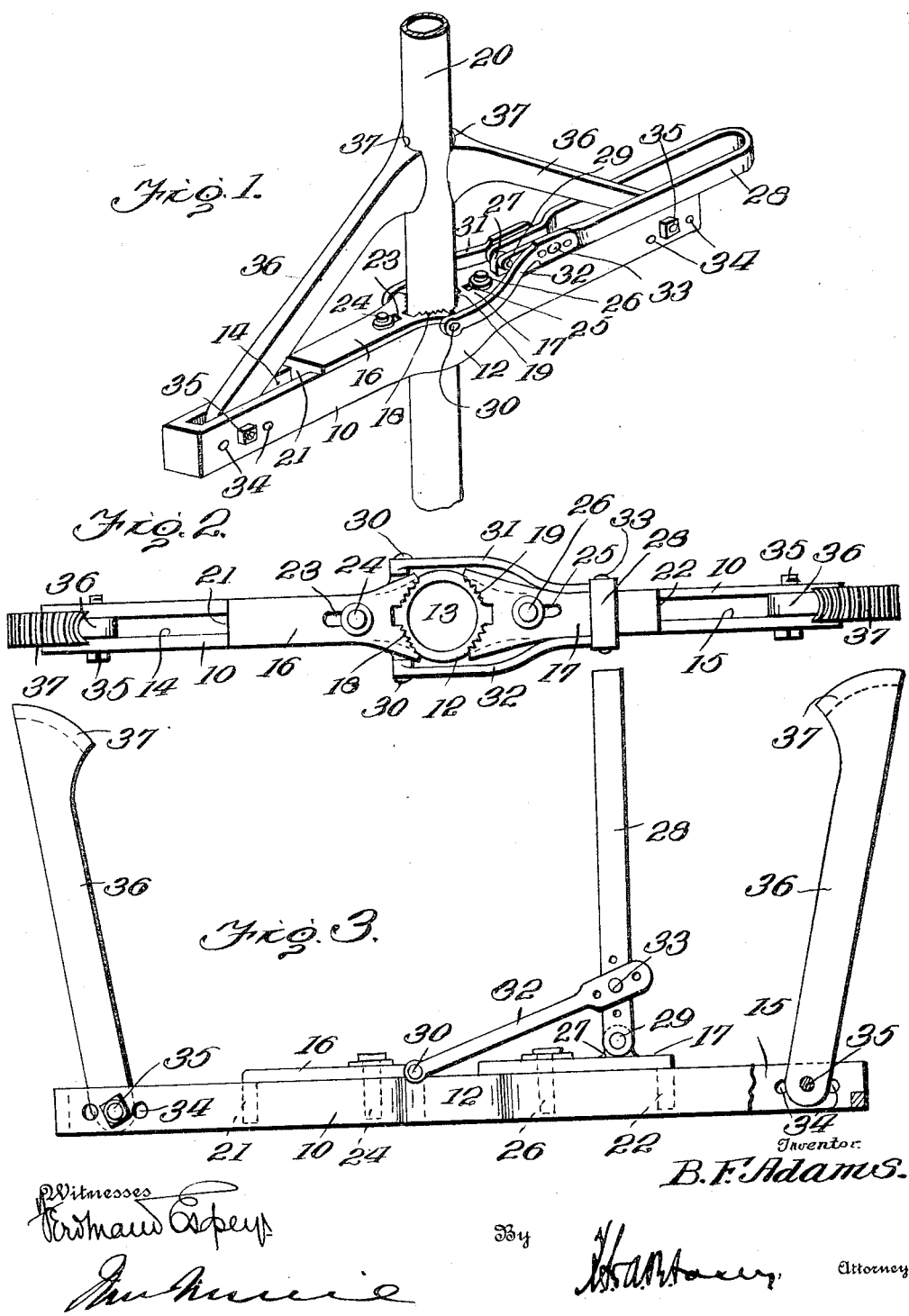

BENJAMIN F. ADAMS, OF STRATFORD, TEXAS, ASSIGNOR OF ONE-THIRD TO L. M. PRICE, OF STRATFORD, TEXAS.

PIPE AND ROD CLAMP.

1,123,156.  Specification of Letters Patent.  Patented Dec. 29, 1914.

Application filed June 25, 1913.  Serial No. 775,755.

*To all whom it may concern:*

Be it known that I, BENJAMIN F. ADAMS, citizen of the United States, residing at Stratford, in the county of Sherman and State of Texas, have invented certain new and useful Improvements in Pipe and Rod Clamps, of which the following is a specification.

This invention relates to improvements in devices for supporting pipes and rods in position, more particularly to devices employed for holding the tubes in artesian wells, oil wells, and the like, and has for one of its objects to improve the construction and increase the efficiency and utility of devices of this character.

Another object of the invention is to provide a simply constructed device whereby the pipe may be firmly gripped at any desired point and at the same time supported in vertical position.

With these and other objects in view the invention consists in certain novel features of construction as hereinafter shown and described and then specifically pointed out in the claims, and in the drawings illustrative of the preferred embodiment of the invention.

Figure 1 is a perspective view of the improved device with a section of pipe engaged thereby. Fig. 2 is a plan view with the gripping jaws and brace members disposed in inoperative position. Fig. 3 is a side elevation of the parts shown in Fig. 2 and partly in section.

Corresponding and like parts are referred to in the following description and indicated in all the views of the drawings by the same reference characters.

The improved device comprises a supporting frame or body oblong in outline and represented as a whole at 10 and widened at the center as represented at 12 with a relatively large opening 13 in the widened portion, the opening designed to receive the pipe or rod to be gripped. Near the ends the frame 10 is formed with longitudinal recesses or slots 14—15. Bearing upon the upper face of the body 10 are plates 16—17, the plate 16 having serrated pipe engaging jaw faces 18, while the plate 17 is provided with similar serrated jaw faces 19. The bearing faces of the jaws 18—19 are disposed obliquely to the longitudinal plane of the plates and are designed to bear upon opposite sides of the rod or pipe, a portion of a pipe being represented conventionally at 20. At its outer end the plate 16 is downturned as represented at 21 to slidably engage in the slot 14, while the plate 17 is downturned at its outer end as represented at 22 to slidably engage in the slot 15. The plate 16 is provided with a longitudinal guide slot 23 which bears over a guide stud or pin 24 in the body 10 at one side of the opening 13, while the plate 17 is provided with a similar longitudinal guide slot 25 which engages over a guide stud or pin 26 secured in the body 10 at the opposite side of the opening 13. By this simple means the plates 16—17 are slidably disposed upon the body 10 and movable toward and away from the opening 13, and also maintained constantly in parallel relation to the body.

Rising from the plate 17 is a lug 27 to which a lever arm 28 is pivoted at 29, the lever arm being preferably formed with spaced sides as represented in Fig. 1. The plate 16 is provided with laterally directed studs 30 to which links 31—32 are pivotally united, the opposite ends of the links being pivoted at 33 to the lever arm 28. The links are so proportioned that when the lever arm 28 is disposed in vertical position as shown in Figs. 2 and 3 the plates 16—17 will be disposed in their outward position, or at their farthest points away from the pipe 20, leaving the device free to be moved vertically upon the pipe, or to permit the pipe to move vertically through the device, the distance between the pivots 29 and 33 will be so proportioned that when the lever arm 28 is turned downwardly into substantial parallel relation to the body 10 the gripping jaws 18—19 of the plates 16—17 will be drawn toward each other and closely engage the pipe.

The lever arm 28 and the links 31—32 are provided with a plurality of apertures to receive the stud 33 so that the relative movement between the plates may be adjusted to adapt the device to pipes or rods of varying diameters as will be obvious. By this simple means the rod or pipe may be firmly gripped and held within the frame 10, and the latter supported upon any suitable holding device or structure, such as the curbing or framework surrounding a driven well, artesian well, oil well, or the like, or employed within a locality where it is designed to grip and support a rod or pipe.

The sides of the frame 10 near the outer end are provided with a plurality of apertures indicated at 34 to receive pivots 35 whereby brace arms 36 may be swingingly coupled to the frame and movable vertically toward the center of the latter. Each of the brace members 36 is enlarged at the outer end and formed with a curved concaved bearing face 37 which is provided with serrations or teeth to prevent slipping. The members 36 are designed to bear upon opposite sides of the pipe or rod above the gripping members 16—17 as represented in Fig. 1.

Having thus described the invention, what is claimed as new is:

1. A device of the class described comprising a body having a central opening to receive the element to be engaged and provided with guide slots near the ends, gripping members constantly retained in parallel relation to the body and slidable toward and away from each other and provided with downturned ends engaging in said guide slots, and means for simultaneously actuating said gripping members.

2. A device of the class described comprising a body having a central opening to receive the element to be engaged and provided with guide slots near the ends, gripping members slidable toward and away from the opening and provided with downturned ends engaging in said guide slots, a lever arm swingingly coupled to one of said gripping members, and links coupled respectively to said lever and the other of said gripping members.

In testimony whereof I affix my signature in presence of two witnesses.

BENJAMIN F. ADAMS. [L. S.]

Witnesses:
M. CAMMACK,
J. P. REEDER.